United States Patent [19]

Yates

[11] 3,920,578

[45] Nov. 18, 1975

[54] COLLOIDAL SILICA-BASED BINDER VEHICLES AND GELS

[75] Inventor: Paul Clifford Yates, Wilmington, Del.

[73] Assignee: E. I. Du Pont de Nemours & Company, Wilmington, Del.

[22] Filed: Feb. 26, 1971

[21] Appl. No.: 119,414

Related U.S. Application Data

[63] Continuation-in-part of Ser. No. 736,247, June 12, 1968, abandoned.

[52] U.S. Cl. ......... 252/313 S; 106/38.3; 106/38.35; 106/69; 106/287 S; 252/62; 252/317; 252/451
[51] Int. Cl.² .......................................... B01J 13/00
[58] Field of Search ................ 252/313 S, 317, 451; 106/38.3

[56] References Cited
UNITED STATES PATENTS 2,886,466   5/1959   Iler et al. ..................... 252/313 S X
2,992,930   7/1961   Wheeler et al. ............... 106/38.3 X

*Primary Examiner*—Richard D. Lovering

[57] ABSTRACT

Rapid-gelling binder vehicles are produced by admixing a small amount of a water-soluble alkaline ionic silicate with a colloidal amorphous silica aquasol and adjusting the resulting composition to a pH of from 5 to 9.5. The amount of alkaline ionic silicate added is within the range of from 0.083 to 1.67 moles per 1000 grams of binder vehicle exclusive of silica and is dependent on the concentration and median particle diameter of the colloidal silica, the concentration of neutral salts and the pH to which the composition is to be adjusted. A binder vehicle prepared in this manner gels within from 5 to 300 seconds to form a gel structure having an exceptionally high porosity, wide pore diameters and high strength and attrition resistance.

20 Claims, No Drawings

COLLOIDAL SILICA-BASED BINDER VEHICLES AND GELS

CROSS-REFERENCE TO RELATED APPLICATIONS

This application is a continuation-in-part of my co-pending application Ser. No. 736,247, filed June 12, 1968, now abandoned.

BACKGROUND OF THE INVENTION

This invention relates to silica-based binder compositions, to shaped structures prepared therefrom and to methods of preparing such compositions and structures.

A wide variety of silica-based binder compositions are known in the art. For example, the art discloses the use of alkaline ionic silicates such as sodium metasilicate, tetramethylammonium silicate and tetraethanolammonium silicate. These binders have been employed with good success for bonding roofing granules, as adhesives for boxboards and as binders for zinc-rich paints. When air dried or dried with heating, strong, rigid bonds are obtained. but these alkaline ionic silicates are water-sensitive and are of only limited value in high temperature applications because of their low melting and softening points.

Alkaline ionic silicates neutralized with aqueous or gaseous acidic materials have been found to be useful for binding catalysts and in the preparation of refractory cements. These polymerized silicates, however, cannot be produced with high solids content because neutralization brings almost instantaneous gelling; it is therefore not possible to obtain homogeneous materials by mixing concentrated solutions of acids and alkaline ionic silicates. Gels prepared by mixing dilute solutions of acid and silicate shrink and crack excessively when dired. Also, unless removed by washing, the large quantities of neutral salts formed by the neutralization seriously limit the refractory characteristics of the gels and their usefulness as catalyst binders. Because of the exceedingly finepored structure of the gels, i.e., seldom in excess of 100 Angstrom units, complete removal of these salts from thick walled structures is impractical and often impossible.

Reasonably concentrated solutions of organic silicates, such as hydrolyzed ethyl orthosilicate, can be prepared and the pH of such solutions can be adjusted so as to obtain gel formation in a period of time which is neither too long nor too short for practical handling. While such binders have been employed to good advantage in preparing precision investment casting molds and shells for casting molten metals, the organic silicates are quite expensive and the alcohol which unavoidably accompanies the use of ethyl orthosilicate creates serious fire, explosion and health hazards.

Aqueous colloidal amorphous silica sols have also been utilized as refractory binders and to prepare precision investment casting molds. Flocculation or coagulation of the colloidal silica particles to effect gelation of these sols is accomplished by adjusting the pH of the sol to a range where the charge on the particles is low and by simultaneously adding a neutral salt, such as magnesium chloride to enhance destabilization. Such gels have a number of advantages compared with gels formed by neutralization of alkaline ionic silicates; namely, the average diameter of the pores are large and the contaminating salts can be maintained at lower levels. The gels, however, also have several deficiencies which limit their usefulness. First, their gel times are inconveniently long, e.g., from fifteen minutes to many hours. Secondly, since the colloidal particles are bonded only at their surfaces, and there only at touching or tangent points, the gels are relatively weak. The larger the particle size of the colloidal particles, the smaller is the number of atoms located at the surfaces of the particles and the fewer and more poorly bonded are the junction points in the gel structure. Therefore, while relatively fine colloidal particles, i.e., 5 to 30 m$\mu$ in diameter, are reasonably well bonded, particularly the smallest ones, the strength of bonding obtained between particles above about 30 m$\mu$ is so weak that the gels have virtually no attrition resistance. In fact, gels comprised of particles having diameters greater than about 30 m$\mu$ tend to collapse when dried; the drying often forces the particles into a dense, hexagonal or orthorhombic type packing.

Realizing the deficiencies of silica sols as gel precursors, attempts have been made to reinforce the relatively weak junction points in gels produced by flocculation or coagulation of silica sols. In Alexander et al., U.S. Pat. No. 2,765,242, there is disclosed a reinforcing technique heating the gel structure to cause migration of material from areas of highest curvature to areas of negative radius of curvature located at the junction points between the particles. Gels can also be reinforced by the addition of high surface area colloidal silica or silicic acid. Although substantial gel strength increases are obtained, these techniques are generally not applicable to the formation of macroscopic formed bodies since reinforcement is accomplished after the gel is formed. The introduction of high surface area colloidal silica or silicic acid into a large body of gel, however, is not practical because of the inordinately long periods of time required and the inability of obtain a homogenous distribution of the reinforcing agent. Heating is effective to obtain reinforcement of large bodies of gel comprised of small colloidal silica particles, but the reinforcement obtained is negligible if the particles comprising the gel have an average diameter greater than about 30 m$\mu$.

From the above discussion it will be seen that there is a need for rapid-gelling, silica-based binder compositions having high solids contents which will convert to gels having good refractory characteristics, high strength, attrition resistance and porosity, wide pore diameters and regular pore size distributions. Such binder compositions are the subject of this invention.

SUMMARY OF THE INVENTION

In summary, this invention is directed to a composition of matter comprising:

a. from 0% to 92% by weight of a particulate or fibrous filler material and b. from 5% to 100% by weight of an aqueous binder vehicle comprising from 20% to 75% by weight of colloidal amorphous silica having a median particle diameter of from 5 to 500 m$\mu$; from X to Y moles of dissolved alkaline ionic silicate per 1000 grams of said vehicle exclusive of said silica where X and Y are as follows:

$$X = 10\left[1.90 - \frac{\phi}{2}\left(1.762 + \frac{35.2}{D}\right) - \frac{pH}{2} + \frac{\exp.(pH-10.27)}{S}\right]$$

$$Y = 10\left[3.70 - \frac{\phi}{2}\left(1.762 + \frac{35.2}{D}\right) - \frac{pH}{2} + \frac{\exp.(pH-9.40)}{S}\right]$$

wherein $\phi$ is the volume fraction of silica in said vehicle, D is said median particle diameter and S is the number of moles of dissolved cations other than hydrogen per 1000 grams of said vehicle exclusive of silica, with the proviso that X is not less than 0.083 and Y is not greater than 1.67; and an amount of an acid sufficient to adjust the pH of said vehicle to from 5.0 to 9.5.

This invention is also directed to a silica gel comprising from 0% to 95% by weight of a particulate or fibrous filler material and at least 5% by weight of amorphous colloidal silica particles having a median particle diameter of from 5 to 500 m$\mu$, said colloidal silica particles being rigidly interconnected in a porous three-dimensional network by from 0.5 to 10% by weight of a polymerized alkaline ionic silicate.

This invention is further directed to a silica gel comprising from 0% to 95% by weight of a particulate or fibrous filler material and at least 5% by weight of amorphous colloidal silica particles having a median particle diameter of from 5 to 500 m$\mu$, substantially all of said colloidal silica particles having diameters of from 0.8 to 1.2 times said median particle diameter, said colloidal silica particles being rigidly interconnected in a porous, three-dimensional network by from 0.5 to 10% by weight of a polymerized alkaline ionic silicate, at least 60% of the pores in said network having a pore diameter of from 0.8 to 1.2 times the median diameter of said pores, said median pore diameter being from 0.5 to 1.5 times said median particle diameter, the pore volume of said network being from 45% to 75% of the volume of said network and said gel having a transverse rupture strength of at least 1500 psi.

This invention is still further directed to a process for producing a shaped structure comprising the steps of:
1. forming a composition comprising
   a. from 0% to 95% by weight of a particulate or fibrous filler material and
   b. from 5% to 100% by weight of an aqueous binder vehicle comprising from 20% to 75% by weight of colloidal amorphous silica having a median particle diameter of from 5 to 500 m$\mu$; from X to Y moles of dissolved alkaline ionic silicate per 1000 grams of said vehicle exclusive of said silica where X and Y are as follows:

$$X = 10\left[1.90 - \frac{\phi}{2}\left(1.762 + \frac{35.2}{D}\right) - \frac{pH}{2} + \frac{\exp.(pH-10.27)}{S}\right]$$

$$Y = 10\left[3.70 - \frac{\phi}{2}\left(1.762 + \frac{35.2}{D}\right) - \frac{pH}{2} + \frac{\exp.(pH-9.40)}{S}\right]$$

wherein $\phi$ is the volume fraction of silica in said vehicle, D is said median particle diameter and S is the number of moles of dissolved cations other than hydrogen per 1000 grams of said vehicle exclusive of silica, with the proviso that X is not less than 0.083 and Y is not greater than 1.67; and an amount of acid sufficient to adjust the pH of said vehicle to from 5.0 to 9.5, and
2. maintaining said composition in the shape desired for said structure for a time sufficient for gelation to occur, said time being from 5 to 300 seconds.

DETAILED DESCRIPTION OF THE INVENTION

This invention is founded on the discovery that preformed colloidal silica particles in an aquasol can be immobilized or "frozen" in place essentially as they exist in the sol by adding a small, controlled amount of water-soluble alkaline ionic silicate and by controlling the conditions of the process to preferentially cause polymerization of the ionic silicate between the particles of preformed silica, without bringing about coagulation or flocculation of the silica particles. To effect this most desirable result, it is essential that a number of variables be taken into consideration, i.e., the concentration and particle size of the colloidal amorphous silica particles, the pH of the solutions and the amount of neutral salt present. As will be seen by reference to the above Summary of the Invention and as discussed further hereinbelow, these variables are interrelated in their effect and must, therefore, be considered in relation to one another.

The binder vehicles of this invention differ from colloidal silica-containing binder vehicles of the prior art in a number of respects. The vehicles of this invention contain a carefully controlled, relatively minor amount of a water-soluble alkaline ionic silicate in conjunction with concentrated sols of preformed amorphous silica. The amount and particle size of the colloidal silica, the concentration and ratio of alkaline ionic silicate, the concentration of salts, the relative proportions of these constituents to one another and the pH are carefully "balanced" so as to insure a predeterminable gel time of from about 5 to about 300 seconds and to obtain the unique gel characteristics discussed below. The total silica content is substantially in excess of that finally achieved with ionic alkali silicates or ethyl orthosilicate solutions, and the gels of this invention therefore suffer much less from the problems of shrinkage and cracking than do those of the prior art. In comparison with binder vehicles containing only colloidal amorphous silica, those of the present invention gel much more rapidly, have controllable gel times within a convenient time range for most applications, and have much stronger gel structures. The vehicles of this invention are also relatively inexpensive compared, for example, with ethyl orthosilicate, and can be conveniently prepared by simple mixing operations from materials which have good storage stability.

The gels of this invention possess a unique combination of most desirable characteristics; namely, an unusual degree of strength and attrition resistance, high porosity and exceptionally wide pore diameters. If silica sols having a narrow particle size distribution are employed the gels obtained also have very regular pore size distributions. The pore size distribution of the such gels of this invention has very practical advantages when the gels are used as catalyst substrates, in chromatographic separations or in refractory applications. When the pores in a silica body are heterogeneous and range from very small pores up to very large pores, the process of sintering or consolidation of this gel structure as it is heated is similarly heterogeneous. The small pores tend to sinter and disappear from the structure at quite low temperatures, and thus provide strong walls which resist further sintering and shrinkage. Thus, in heterogeneous gels, eliminating porosity in the form of medium size and large pores is very difficult unless excessively high firing temperatures and long times are employed. Gels of this invention prepared from sols having narrow particle size distribution are not subject to this difficulty due to their exceeding regularity of packing. In fact, they are characterized by an almost perfect open-packed cubic structure wherein most particles are surrounded by and touching six others. Thus, they tend to maintain their open porosity up to relatively high temperatures, but when eliminated, substantially all of the porosity is eliminated simultaneously and exceptionally strong, non-porous structures are obtained.

Another unusual feature of the gels of this invention is that the attrition resistance and strength are not limited by the silica particle size or the pore size. This is in contrast to gels formed by flocculation or coagulation of amorphous silica sols, where, as previously explained, the larger the pore diameter and the larger their particle diameter, the weaker and the less attrition resistant is the structure. With the gels of this invention the strength and attrition resistance can be independently adjusted by variations in the silicate content so that gels containing larger sized silica particles can be made just as stable, strong and attrition resistant as gels containing small silica particles. All the gels of this invention have transverse rupture strengths of at least 1500 psi.

In general, it has not been found to be highly critical which of a number of available water-soluable alkaline ionic silicates is used in the practice of this invention. Examples of such silicates are lithium silicate, sodium silicate, potassium silicate and silicates of strong organic bases such as tetramethylammonium and tetraethanolammonium hydroxides and guanidine. Alkaline solutions of silicates of weaker bases such as ammonia and organic amines are actually not ionic and are not satisfactory for use in the practice of this invention. The water-soluble alkaline ionic silicates useful in the methods and compositions of this invention will ordinarily have mole ratios $SiO_2$ to alkaline oxide of from about 2 to about 4.5.

As will be discussed in further detail hereinafter, certain adjustments can be made in other aspects of the process, such as the pH, to allow for differences in the rate of gel formation which are occasioned by the cation of the ionic silicate. Except for such variances in the rate of gelation, however, it appears that all alkaline ionic silicates behave in an approximately equivalent fashion for the purposes of this invention.

The concentration of alkaline ionic silicate present in the binder vehicles of the invention, which are the fluid precursors of the gels of the invention, constitute a critical variable. If too small a quantity of alkaline ionic silicate is present, the strength of the bond formed between the silica particles by the polymerization of the silicate will be insufficient to maintain the almost perfect regularity which exists in solution at the moment of gelation against the forces exerted by shrinkage and by the surface tension of the solvent. Conversely, if the concentration of alkaline ionic silicate is too high, many of the difficulties previously noted in regard to adequately mixing concentrated solutions of silicates with neutralizing materials will be encountered. In addition, undesirably large quantities of salt will be introduced with concurrent problems of purification and/or deterioration in catalytic and refractory properties.

It has also been found that too large a quantity of alkaline silicate will result in a heterogeneous structure, with certain portions of the resulting gel being characterized by the extremely fine-pored structure of a typical prior art silicate gel, while other portions will have the wider, more open-pored and regular structure which can be achieved in the gels of this invention. It has been determined that it is necessary to maintain the alkaline ionic silicate concentration in the binder vehicles of this invention within the ranges of from broadly 0.083 to 1.67 moles, and preferably from 0.167 to 1.00 moles per 1000 grams of vehicle exclusive of silica.

The alkaline ionic silicate concentration in the binder solutions of the invention can be achieved by the introduction of weighed quantities of standardized solutions of such alkaline ionic silicates, or it can be determined analytically by means of the molybdic acid colorimetric procedure which is described in an article entitled "The Solubility of Amorphous Silica in Water", by G. B. Alexander, W. M. Heston and R. K. Iler, *J. Phys. Chem.* 58, 453(1954). When the concentration is determined by the molybdic acid colorimetric procedure described in this reference, the percentage of alkaline ionic silicate according to the processes of this invention is that amount of silicate which develops a color within 20 minutes under the standardized conditions of this test.

There are many amorphous silica sols known to the prior art prepared by many different process routes. Some are prepared by nuleating and growing amorphous silica particles in aqueous solution, others by hydrolyzing ethyl orthosilicate and still others by oxidizing silicon tetrachloride. The prior art also discloses a number of surface modifications of silica sols; these include esterification of the surface with organic alcohols and the adsorption of polyvalent metal ions such as aluminum, iron, chromium, etc., onto the surface. Many stabilizing bases have also been employed in the preparation of such sols. In addition, the art has shown a broad range of particle sizes, as well as differences in the degree of aggregation of the particles. Broadly speaking, all such sols are suitable for the processes and compositions of this invention.

For obvious reasons, if gels having uniform pore size distributions are desired, it is necessary that the starting sol be quite homogeneous in its particle size distribution, since deviations from a uniform size distribution in the particles will be reflected in a broadened pore size distribution in the product gel. It is also desired for the same reason that the starting sols have the minimum possible degree of pre-existing aggregation. Thus, if a sol in which substantially all of the colloidal silica particles have diameters of from 0.8 to 1.2 times their median diameter is used, then at least 60% of the pores in the resulting gel have diameters of from 0.8 to 1.2 times the median pore diameter, the median pore diameter is from 0.5 to 1.5 times the median particle diameter and the pore volume of the gel represents from 45% to 75% of its total volume.

The particle size of the colloidal silica can vary widely between the limits of 5 and 500 m$\mu$ in particle diameter, and depends somewhat on the end use envisioned. For example, if the compositions of the invention are to be used as catalyst supports, chromatographic substrates, or, in general, for those purposes wherein the binder solutions of the invention are to be employed as the sole or primary constituent of the resulting gel, it is desirable to use particles where the average particle diameter has a minimum value of about 50 m$\mu$. This is because in applications of the type described, a wide-pored and uniform structure offering easy access of materials into and out of the gel structure is desirable, and also because it is possible to prepare such sols at very high silica concentrations.

Alternatively, if the purpose for which the compositions of the invention are to be used is in preparing a refractory binder, the pore size in such instances is not particularly critical and indeed it may even be advantageous to have a rather fine-pored structure in order to sinter it at the lowest possible temperature.

Thus, in those compositions of the invention wherein the binder vehicle comprise only a minor portion of the total, with the additional material being a ceramic material such as refractory amorphous silica grain, zircon, clays, refractory fibers such as glass fibers, amorphous silica fibers, aluminosilicate fibers, etc., the mean colloidal amorphous silica particle diameter can be as small as 5 millimicrons. It is difficult to use smaller diameter particles than this because of the problems of mixing ionic silicates with such materials without coagulating the silica sol.

There is actually no sharp upper limit in regard to the sol particle size. However, since particles larger than 500 millimicrons in diameter offer no specific advantage, this particle size can be specified as the upper limit. Particles larger than this have a tendency to settle out of solution unles rapid gel times are employed, and it is therefore difficult to maintain the desired homogeneity of structure.

From the preceding discussions, it will be evident that if too dilute preformed colloidal silica sols are employed, the particles in the binder vehicles of this invention will have to shrink through great distances as the solvent in the system is evaporated, in order to achieve the open-packed cubic structure characteristic of the gels of the invention. Within limits, such shrinkage does in fact occur, but is not accompanied by an undesirable degree of cracking or disruption of the gel structure from shrinkage forces.

It has been found that colloidal amorphous silica concentration in the binder vehicle must be maintained within the limits of from 20% to 75% by weight. Below a 20% concentration, for example, even at a 15% concentration, it is found that the shrinkage forces are too great to be withstood. Such vehicles crack excessively on drying and have virtually no utility as binders. Similarly, above 75% concentrations of colloidal silica, the vehicle becomes so viscous that it is difficult if not impossible to mix it sufficiently rapidly with the other constituents of the binder compositions of the invention to attain a homogeneous structure. In the preferred vehicles of this invention, the colloidal amorphous silica is present at a concentration of from 25 to 60% by weight.

It is not possible to obtain compositions of this invention or to practice the processes of this invention simply by arbitrarily selecting a particular pH within the ranges stated, a particular concentration and particle size of colloidal amorphous silica, and a particular concentration of alkaline ionic silicate of any desired ratio. This is because all of these variables are related to one another in a very complex way. The effect of even single composition variables tends to be rather complex. For example, if the pH of the binder compositions of the invention is varied within the range of from 5 to 9.5, it will be noted that the gel time initially decreases rapidly as the pH increases, then reaches a minimum and then increases as the pH is increased. Also the rate of initial decrease, the location of the minimum in the gel time and the rate of final increase as a function of pH are influenced by the amount of neutral salt which is present. The minimum amount of neutral salt present is in turn determined by the ratio of silica to alkali in the alkaline ionic silicate.

The gel time is also appreciably affected by the particular alkaline ionic silicate employed, as well as the particular acid employed to adjust the pH of the binder solution. Thus the gel time is not the same for an organic ionic silicate such as tetraethanolammonium as it is for sodium silicate, nor is it the same if acetic acid is employed for neutralization as opposed to sulfuric acid; generally, the larger the size of the hydrated cation, the shorter is the gel time, whereas the higher the negative charge density on the acid anion, the longer is the gel time. The gel time is also affected by the amount and the particle size of the preformed colloidal amorphous silica which is present in the composition. The smaller the particle size of this material and the higher its concentration, the shorter is the gel time, at least as long as all of the variables already mentioned at constant values. Unless these interrelationships are taken into account, one may very well not even be able to mix arbitrarily selected amounts of silicates and amorphous silica at arbitrarily selected pH's, even within the limits stated, without the occurrence of premature gelling, excessive salt contamination and the formation of weak and useless gels.

After very extensive experimental work, it has been found that no matter what the specific values for colloidal silica concentration and particle size, salt content, alkaline ionic silicate ratio and pH of neutralization and no matter what specific acid and alkaline ionic silicate are employed, binder vehicles of the following composition will gel in from 5 to 300 seconds to form gels which are exceptionally strong both in the wet state and after drying and which have a unique, extremely regular "trapped sol" structure: from 20% to 75% by weight of colloidal amorphous silica having a median particle diameter of from 5 to 500 m$\mu$; from X to Y moles of dissolved alkaline ionic silicate per 1000 grams of said vehicle exclusive of said silica where X and Y are as follows:

$$X = 10\left[1.90 - \frac{\phi}{2}\left(1.762 + \frac{35.2}{D}\right) - \frac{pH}{2} + \frac{\exp.(pH-10.27)}{S}\right]$$

$$Y = 10\left[3.70 - \frac{\phi}{2}\left(1.762 + \frac{35.2}{D}\right) - \frac{pH}{2} + \frac{\exp.(pH-9.40)}{S}\right]$$

wherein $\phi$ is the volume fraction of silica in said vehicle, D is said median particle diameter and S is the number of moles of dissolved cations other than hydrogen per 1000 grams of said vehicle exclusive of silica, with the proviso that X is not less then 0.083 and Y is not greater than 1.67; and an amount of an acid sufficient to establish a pH of from 5.0 to 9.5.

Although the general expression just discussed will enable a gel time between about 5 and 300 seconds to be obtained, for many purposes it may be desired to select particular gel times within this broader range.

As noted previously, the gel time is a function to some degree of the specific salt (including both the cation and anion) furnished by neutralization of the alkaline ionic silicate used. Thus if lithium silicate is employed as the alkaline ionic silicate and acetic acid is used for pH adjustment, the resulting salt would be lithium acetate. Similarly, if sodium silicate is employed as the alkaline ionic silicate and hydrochloric acid were used for pH adjustment, the salt would be sodium chloride. The expression for X and Y can be generalized in the form given below, where the constants $K_1$ and $K_2$ together reflect the specific salt effect:

$$X \text{ or } Y = 10 \left[ K_1 - \frac{\phi}{2}\left(1.762 + \frac{35.2}{D}\right) - \frac{pH}{2} + \frac{\exp.(pH - K_2)}{S} \right]$$

The values of these constants are given in Table 1 for a number of representative salts, and expressions for X and Y can be developed for any particular salt by substituting the value of $K_1$ for 300 seconds to obtain the lower limit of the concentration of alkaline ionic silicate (X) and the value of $K_1$ for 5 seconds to obtain the upper limit (Y).

Table 1

| Salt | $K_1$ (5 seconds) | $K_1$(300 seconds) | $K_2$ |
|------|---------|-----------|-------|
| KAc* | 3.70 | 2.81 | 10.27 |
| NaAc | 3.73 | 2.84 | 10.18 |
| LiAc | 3.48 | 2.59 | 9.74 |
| TAc** | 2.80 | 1.91 | 10.11 |
| NaCl | 3.46 | 2.57 | 9.87 |
| Na$_2$SO$_4$ | 3.58 | 2.69 | 9.40 |

*Ac = acetate anion
**T = tetraethanolammonium cation.

If gel times between 5 and 300 seconds are desired, the amount of alkaline ionic silicate to reach a particular gel time can be determined by making use of the fact that the gel time is related to the concentration of alkaline ionic silicate in an inverse square fashion. By this it is meant that if the concentration of alkaline ionic silicate is doubled, for example, the gel time is decreased by a factor of four. Similarly, if the concentration of alkaline ionic silicate is decreased by a factor of 5, the gel time is increased by a factor of 25.

By means of the relationships given in the expression for X and Y and the constants in Table 1, and the foregoing information concerning the effect of alkaline silicate on the gel times, it will be possible for one skilled in the art to select specific predetermined gel times, even within this range, with considerable accuracy, i.e., ± 10%, for different alkaline ionic silicates, neutralizing acids, particle sizes and concentrations of colloidal amorphous silica, pH values and salt contents.

In the discussion up to this point, it has been tacitly assumed that the temperature of the gelling reaction would be room temperature, i.e., 25°C., and this is, in fact, usually the most convenient temperature to employ. However, the gel time is, of course, very sensitively influenced by temperature, and studies have shown that its temperature coefficient corresponds to an activation energy of approximately twenty kilocalories. This means that every 10°C. increase in temperature will decrease the time required for gel formation by a factor of two. It will be readily apparent to those skilled in the art that by using the classical Arrhenius expression and the activation energy given above, the gel time at any desired temperature within the range of from 0° to 100°C. can be calculated from the values at room temperature in the conventional manner.

The binder vehicles of this invention can be employed separately or in admixture with one or more particulate or fibrous filler materials to form compositions which can be gelled to form foundary stool coatings, paint-like coatings, shaped structures other than coatings, e.g., precision investment casting molds, and the like. The relative proportions of the binder vehicle to particulate or fibrous material can vary within broad limits, depending upon the degree of strength required. The higher the percentage of the binder compositions of the invention, the more strongly bonded will be the resulting bodies. It is usually necessary to have at least 5% by weight of the final body consist of the solids content of the binder vehicles of the invention. The amount of the binder vehicle required to achieve this solids content can easily be calculated from the composition of the binder vehicle and the amount of particulate or fibrous material to be bonded. It is generally preferred that the solids derived from the binder vehicle constitute at least 10% by weight of the gel.

As previously mentioned, if the binders of the invention are to be used as the primary or sole constituent of the final dried body, larger particle size and more concentrated colloidal amorphous silica solutions should by employed to minimize cracking and shrinkage. For example, if the binders of the invention are to be used as the sole constituent, it is preferable that the particle diameter of the colloidal amorphous silica be in excess of 50 millimicrons, and that the concentration of colloidal silica in the vehicle be at least 30% by weight. On the other hand, if the vehicle is to be mixed with particulate or fibrous materials in the amount of perhaps only 10% by weight, as described above, then it is possible to use lower concentrations of colloidal amorphous silica and of a smaller particle size, such as the lower limiting amounts of 20% by weight of the binder solution and a 5 millimicron particle size.

Almost any particulate or fibrous material may be bonded with the compositions of the invention, and the choice is not critical except to the degree that their own inherent properties may influence the end use. For example, if the final bonded body is to be employed in high temperature applications, one would, of course, select a refractory particulate material which was sufficiently high melting and stable to withstand the expected service conditions. In preparing molds for precision casting of metals, one might employ refractory amorphous silica grain, zircon, mullite, or similar materials which have very high melting and softening points. For other uses, such as in insulation or refractory papers or mats, refractory fibers can be bonded. Such fibers include asbestos, glass, rock wool, aluminosilicate fibers, pure amorphous silica fibers, or fibers or whiskers of boron nitride, silicon carbide or nitride, alumina, metallic boron, carbon and others. Additives such as wetting agents, antifoam agents and the like can also be included in the vehicles of this invention.

As will be seen from the above description, the binder vehicles of the invention are characterized by the concentration of alkaline ionic silicate, the concentration and particle diameter of the colloidal amorphous silica constituent, and the pH. The concentration of the alkaline ionic silicate and of the preformed colloidal amorphous silica can be predetermined by using standardized weighed quantities of known concentrations, or they can be determined by analyzing the binder solution by conventional methods. The silica concentration of the alkaline ionic silicates can be determined using the previously described molybdic acid colorimetric procedure. The concentration of colloidal amorphous silica can also be determined by dialyzing to separate it from the alkaline ionic silicate and determining the amount of colloidal amorphous silica by gravimetric techniques. It can also be determined by removing the alkaline ionic silicate by means of a mixed bed ion exchange resin, followed by gravimetric determination of the concentration of colloidal silica, which is not removed by this technique. The pH of these solutions can be determined as is conventional by means of a glass electrode and a pH meter or by any of the other conventionally applied techniques for determining the pH of aqueous solutions. The particle diameter of the colloidal amorphous silica can be determined by means of an electron micrograph and a particle size count, or it can be determined on the isolated colloidal amorphous silica after its separation from the ionic alkaline silicate by acidification to a pH of 3 or lower and drying, followed by a determination of the nitrogen surface area of the dried material. The median particle diameter can then be calulated from this surface area using the assumption that the particles are uniform spheres and by using the density of amorphous silica. An equivalent procedure for obtaining the surface area after separation of the alkaline ionic silicate, is a titration of the silanol groups in the presence of concentrated sodium chloride solutions, as described in publication by G. W. Sears, *Analytical Chemistry*, Vol. 28, p. 1981, 1956.

The important characterizing features of the gels of this invention are the particle diameter, density, median pore diameter, pore size distribution, percent porosity and mechanical strength. The particle diameter can be determined by means of the nitrogen surface area after the gels have been dried and heated to a temperature which should not exceed 600°C. It can also be determined by an electron micrograph scan in which it is possible to discern the size of the ultimate particles by inspecting the edges of the irregular gel lumps. Alternatively, the particle size can be determined in the starting amorphous colloidal silica sol, since at least until these are heated to temperatures well in excess of 600°C., the process of gelling does not in itself change this particle size. The density and the percent porosity can be determined by any method of simultaneously measuring the volume occupied by a portion of gel and its weight. This can be done, for example, by measuring the volume by mercury displacement and determining the weight on an analytical balance. The median pore diameter and the pore size distribution can be determined using a mercury porosimeter as is conventional, or it can be determined by means of gas absorption techniques employing conventional methods well known in the art. A determination of the mechanical strength of the gels of this invention can be accomplished by measuring transverse rupture strengths or tensile strengths by conventional means.

The process of the invention will ordinarily be accomplished by mixing an alkaline ionic silicate with a solution of amorphous colloidal silica, adjusting the pH to the desired value within the range of from 5 to 9.5 by means of the rapid addition of an acid, and waiting for from about 5 to 300 seconds for a gel to form. Preferably, the gel is then aged to develop its full wet strength and dried to recover the gel. Optionally, prior to adding the neutralizing acid, it is possible to mix the binder vehicles of the invention with particulate or fibrous filler materials to make a bonded structure. If a binder vehicle having a long gel time is employed, the filler material can also be admixed after the pH adjustment; this, however, is not a preferred procedure, particularly when structures of exceptional homogeneity are desired.

Certain precautions should be observed during the mixing operation. When short gel times are involved, it is of course necessary to employ rapid mixing procedures. This can be conveniently accomplished in a number of ways known to the art such as by jet mixing, mixing with very high speed stirrers as in a Waring Blendor or a colloid mill, or mixing the streams within the barrel of a spray gun in a violently agitated region which immediately precedes the outlet of the gun. To obtain the homogeneous structure characteristic of the compositions of this invention, it is necessary that the mixing time be only a small fraction of the gel time. It will be noted that if the shortest gel times, of the order of 5 seconds, are to be employed, this will require mixing times of the order of perhaps a second or less, which can be achieved by techniques such as jet mixing.

Whereas it will usually be possible to mix the relatively small amounts of alkaline ionic silicates required for the compositions of the invention directly with the colloidal amorphous silica sols, it may sometimes be found that such mixtures are unstable and will start to coagulate or flocculate before the neutralizing acid can be added. If this occurs, it can be avoided by one of several techniques. One is to mix the neutralizing acid with the colloidal amorphous silica and then add the alkaline ionic silicate as the final mixing step. Another procedure is to mix the acid with the alkaline ionic silicate and then add this to the colloidal amorphous silica. Also, the neutralizing acid can be added to one portion of the colloidal amorphous silica, the alkaline ionic silicate can be added to a second portion, and the two resulting mixtures can be combined just prior to application; this is very convenient in spray application, since equal volumes of fluids can be mixed just prior to the spray operation without the need for complex metering equipment.

The pH of the most rapid gel formation lies within the range of from about 6 to about 8, and the mixing operation should be conducted in such a fashion that the binder composition spends a minumum time in this critical pH range until after the ingredients have been homogeneously mixed together.

The gels derived from them do not immediately develop their full wet strength at the instant of the completion of gel formation. In fact, it has been established that a period of time approximately ten times that required for initial gel formation is desirable to ensure that all of the polymerizing constituents in the binder vehicle have joined the gel network. Thus, it is usually desirable to age the gels while minimizing evaporation of water from the gel until at least ten times the period of time required for gel formation initially.

If the strongest possible gels are desired, it is often advantageous to give a further heat treatment or autoclaving treatment to the gels after the aging process. In general, the higher the temperature employed in the heat treating procedure, the less is the time required for further strengthening of the gel. One convenient procedure is to strengthen the gel by placing it in an atmosphere of live steam, or if even higher temperatures and shorter times are desired, by placing the gel in an autoclave under pressure.

It is often found that the addition of a small amount of fibrous material, such as asbestos, cotton linters, paper pulp, and the like, as well as plate-like material such as mica, kaolin, clay, talc, etc., assist substantially in minimizing the tendency of gels to form cracks as a result of shrinkage forces. When refractory bodies are desired, materials such as paper pulp or cotton linters can be employed, even though they are eventually burnt out of the structure, since these materials will strengthen the structure during the critical period when solvent is first eliminated.

It is also useful, in general, to employ graded sizes of the particulate filler material which is to be bonded, and to achieve as high a total solids content as possible in the mixture from which the final body will be prepared. By proper choice of sizes, using techniques of sizing which are well established in the art, it is possible to obtain compositions which exhibit very little shrinkage upon drying.

It should be understood that cracking is a dynamic phenomenon and is at least in part determined by the rate of elimination of the solvent from a gel structure. A crack develops in a gel when the forces resulting from shrinkage or from the surface tension of the solvent exceed the momentary strength of the gel network. The magnitude of the force resulting from this shrinkage is at least partly dependent on the rate of drying. Thus, in general, it is desirable to dry the compositions of this invention as slowly as is practicable considering other factors such as economics. Compositions of the invention which have been reinforced by the addition of fibrous or plate-like material, by the use of graded refractory particulate material, or by heating in an atmosphere of steam to reinforce as discussed previously, or by all of these techniques, are less sensitive to drying rate and can usually be dried quite rapidly.

The compositions and process of this invention are further illustrated by the following examples wherein $\phi$, D and S have the same meanings as above.

EXAMPLE 1

90 Parts by weight of an aquasol containing 30% by weight of uniform colloidal amorphous silica particles having a median diameter of 7 m$\mu$ was mixed with 4.1 parts by weight of 6N sulfuric acid. An amount of the acidified aquasol which contained 20 parts by weight silica was mixed with 80 parts by weight of a refractory amorphous silica grain, 55% of which passes through a 100 mesh screen and was retained on a 200 mesh screen and 45% of which passed through a 325 mesh screen.

To the resulting mixture there was then added in the manner described below, a solution of "F" grade sodium silicate containing 30% by weight $SiO_2$ (i.e., 5 molar in silicate ion) in an amount sufficient to obtain a final silicate ion concentration of 0.602 molal based on the weight of the final composition exclusive of the speed silica and refractory grain. The sodium silicate was added to the silica grain-containing composition by delivering the two materials separately under pressure into the vortex of a very high speed stirrer in such a fashion that the mixing time required was only approximately one second. The resulting mixture which had a pH value of 8.00, and $\phi$ value of 0.160 and an S value of 0.302 was then immediately injected into the cavity of a mold. The mixture gelled within about eight seconds.

The gelled mixture was allowed to age in the mold for an additional 80 seconds; it was then sufficiently strong that the mold could be removed. The replica obtained was autoclaved for a period of 15 minutes at 125°C. under autogenous water vapor pressure, then dried and finally fired to 800°C. for 60 minutes.

The resulting replica was employed as a precision investment casting mold to produce castings from molten steel. The shape and dimensions of the original mold are reproduced in the castings with substantially no distortion and quite close tolerances.

EXAMPLE 2

332 Grams of an aquasol containing 55.67% by weight of colloidal amorphous silica having a median particle diameter of 112 m$\mu$ were mixed with 117.6 grams of distilled water. The resulting sol was mixed in a high speed stirrer with 61.2 grams of sodium silicate ($SiO_2$:$Na_2O$ ratio of 4.5:1) dissolved in 28.8 grams of water. The resulting molality of silicate ion originating from the sodium silicate was 0.480 and the molality of sodium ion was 0.2016. The resulting mixture had a $\phi$ value of 0.163.

Three 90-gram portions of this mixture were adjusted to pH values of 6.5, 7.0 and 7.8, using 1.5, 1.4 and 1.25 ml. of a 1:1 acetic acid:water solution. The gel times for the three resulting solutions were 170, 98 and 186 seconds, respectively. The gels were aged for a period of 240 times their gel times, evaporation of water being prevented by enclosing the gels with vapor-tight seals.

The aged gels were vacuum dried for two weeks and the nitrogen surface area, density and transverse rupture strengths of each were determined. The nitrogen surface areas were 26, 26 and 28 m$^2$/g., respectively, as compared with a nitrogen surface area of 22 m$^2$/g. for the sol from which the gels were formed. The densities were 1.22, 1.23 and 1.22 g./cc., respectively, corresponding to 53.0, 53.5 and 53.0% of the theoretical density of colloidal amorphous silica, respectively. The transverse rupture strengths of the samples were approximately 1500, 1600 and 1800 psi, respectively.

The three gels were then heated to 600°C. for 1 hour and the nitrogen surface area and density of each were found to be substantially unchanged. The transverse rupture strengths were on the order of from 1900 to 2300 psi.

Pore size distributions were determined on the gels after being heated at 600°C. It was found that the median pore diameter in each case was approximately 60 m$\mu$ and that the pores were extremely homogeneous, i.e., more than 90% being between 30 and 70 m$\mu$ in diameter. The combination of high strength, particularly after firing at 600°C., coupled with a wide and uniform pore diameter makes these gels excellent catalyst supports, chromatographic separation substrates and very useful substrates for separating large sized organic polymer fractions from lower molecular weight materials.

The gels were again heated for one hour, this time at 1100°C. The densities of the samples were then 94.8, 97.8 and 98.3% of theoretical, respectively. The transverse rupture strengths were from about 4000 to 5000 psi. This strength compares favorably with that of commercially available fused silica glass. The strength, density and ease of fabrication of these gels make them particularly useful as refractory structural materials.

EXAMPLE 3

The procedure of Example 2 was repeated substituting for the 112 m$\mu$ particle sized sol a like amount of colloidal silica sol having a median particle diameter of 50 m$\mu$. The density, strength and other characteristics of the resulting gels were similar to those of the gels in Example 2. The median pore diameter after heating to 600°C. was 29 m$\mu$. The pores, however, were even more homogeneous, only 20% of the pores being larger than 30 m$\mu$ and only 10% being less than 20 m$\mu$. 85% Of the pores were within ± 5 m$\mu$ of the median pore size.

EXAMPLE 4

This example shows the preparation of a sprayable ceramic which can be employed to prepare ceramic coatings and to prepare precision investment casting molds for molten metal. Two mixtures were prepared. The first contained 1980 g. of an amorphous silica refractory grain, 55% of which passed through a 100 mesh screen and was retained on a 200 mesh screen and 45% of which passed through a 325 mesh screen. The first mixture also contained 1100 g. of an amorphous silica sol containing spherical particles having a median diameter 12 m$\mu$ and having a weight percent of silica of 28%. This sol was prepared by combining 43.4 parts by weight of water and 100 parts by weight of a 40% amorphous silica dispersion and then adding the following: 0.184 parts by weight of a polysaccharide dispersing agent ("Kelzan", available from Keled Co., Clark, N.J.), 0.214 parts by weight of bentonite clay, 2.68 parts by weight of ethylene glycol, 6.24 parts by weight of dipropylene glycol, 0.134 parts by weight of a polyoxyethylene wetting agent and 0.14 parts by weight of a silicone antifoam agent. The 1100 g. of sol were mixed with 66 ml. of a 1:1 glacial acetic acid:water mixture and the previously mentioned 1980 g. of refractory grain. The resulting mixture had a pH of 4.1 and a viscosity such that it took from 8 to 9 seconds to pass through a No. 5 Zahn viscosimeter cup.

The second composition was prepared by combining 1980 g. of the above-mentioned refractory grain, 1070 grams of the above-mentioned 28% silica sol containing the various additives, 330 grams of a 12% aqueous solution of tetraethanolammonium silicate and 100 ml. of water. The second composition had a pH of 11.4 and passed through a No. 5 Zahn viscosimeter cup in 7 seconds. The molality of silicate ion was 0.294 moles per 1000 grams of the composition, exclusive of the weight of the colloidal silica and refractory grain. The molality of tetraethanolammonium ion was also 0.924.

Equal volumes of each of these two compositions were placed in twin two-gallon pressurized tanks connected by pressure hoses to a spray gun which contains a mixing chamber just short of the nozzle. In the mixing chamber was situated a high speed stirrer driven by an air motor attached to the base of the spray gun. As streams from the two tanks cam together in the mixing chamber, they were mixed by the stirrer and the resulting mixture was immediately atomized in the form of a fine spray.

This spray had a pH of approximately 6.1 and had a thixotropic viscosity and gel time such that it remained in place with only a minimum of flow. Within a period of 30 seconds it sets to a rigid gel. In the absence of the small amount of tetraethanolammonium silicate, this spray would not have gelled for many hours and would be essentially useless as a spray mixture.

The ceramic silica shapes produced by spraying this composition on a variety of patterns can be air dried and fired to temperatures as high as 1000°C. and thereby be converted into strong, hard, porous masses of silica which are very useful for preparing ceramic bodies for a variety of uses, e.g., ceramic molds for pouring molten metals.

EXAMPLES 5 – 18

The series of compositions shown below were prepared to demonstrate the effect of the choice of pH $\phi$, S, D and alkaline ionic silicate on gel times. The neutralizing acid employed was acetic acid in each instance.

| Ex. | Colloidal Silica "D" | Colloidal Silica "$\phi$" | Silicate Cation | Silicate Molal Conc. | pH | S | Gel Time (Sec.) |
|---|---|---|---|---|---|---|---|
| 5 | 12 | 0.156 | Lithium | 0.390 | 9.2 | 0.220 | 76 |
| 6 | " | " | " | " | 8.5 | " | 38 |
| 7 | " | " | " | " | 6.55 | " | 71 |
| 8 | 5 | 0.098 | " | 0.866 | 9.8 | 0.684 | 8.5 |
| 9 | " | " | " | " | 5.8 | " | 24 |
| 10 | " | " | " | " | 5.3 | " | 42 |
| 11 | 17 | 0.239 | Tetra-ethanol-ammo-nium | 0.100 | 6.4 | 0.070 | 47.5 |
| 12 | " | " | " | " | 8.0 | " | 300 |
| 13 | 18 | 0.155 | Sodium | 0.466 | 7.9 | 0.233 | 40 |
| 14 | " | " | " | " | 8.5 | " | 85 |
| 15 | " | " | " | " | 8.8 | " | 275 |
| 16 | 112 | 0.163 | " | 0.480 | 6.5 | 0.202 | 170 |
| 17 | " | " | " | " | 7.0 | " | 98 |
| 18 | " | " | " | " | 7.8 | " | 186 |

What is claimed is:

1. A composition of matter consisting essentially of
   a. from 0% to 95% by weight of a particulate or fibrous filler material and
   b. from 5% to 100% by weight of an aqueous binder vehicle consisting essentially of from 20% to 75% by weight of colloidal amorphous silica having a median particle diameter of from 5 to 500 m$\mu$; from X to Y moles of dissolved alkaline ionic silicate per 1000 grams of said vehicle exclusive of said silica where X and Y are as follows:

$$X = 10\left[1.90 - \frac{\phi}{2} - \left(1.762 + \frac{35.2}{D}\right) - \frac{pH}{2} + \frac{\exp.(pH-10.27)}{S}\right]$$

$$Y = 10\left[3.70 - \frac{\phi}{2} - \left(1.762 + \frac{35.2}{D}\right) - \frac{pH}{2} + \frac{\exp.(pH-9.40)}{S}\right]$$

wherein $\phi$ is the volume fraction of silica in said vehicle, D is said median particle diameter and S is the number of moles of dissolved cations other than hydrogen per 1000 grams of said vehicle exclusive of silica, with the proviso that X is not less than 0.083 and Y is not greater than 1.67; and an amount of an acid sufficient to adjust the pH of said vehicle to from 5.0 to 9.5.

2. The composition of claim 1 wherein X is not less than 0.167 and Y is not greater than 1.00.

3. The composition of claim 1 wherein said alkaline ionic silicate is potassium silicate, said acid is acetic acid and X and Y are as follows:

$$X = 10\left[2.81 - \frac{\phi}{2} - \left(1.762 + \frac{35.2}{D}\right) - \frac{pH}{2} + \frac{\exp.(pH-10.27)}{S}\right]$$

$$Y = 10\left[3.70 - \frac{\phi}{2} - \left(1.762 + \frac{35.2}{D}\right) - \frac{pH}{2} + \frac{\exp.(pH-10.27)}{S}\right]$$

4. The composition of claim 3 wherein X is not less than 0.167 and Y is not greater than 1.00.

5. The composition of claim 1 wherein said alkaline ionic silicate is sodium silicate, said acid is hydrochloric acid and X and Y are as follows:

$$X = 10\left[2.57 - \frac{\phi}{2} - \left(1.762 + \frac{35.2}{D}\right) - \frac{pH}{2} + \frac{\exp.(pH-9.87)}{S}\right]$$

$$Y = 10\left[3.46 - \frac{\phi}{2} - \left(1.762 + \frac{35.2}{D}\right) - \frac{pH}{2} + \frac{\exp.(pH-9.87)}{S}\right]$$

6. The composition of claim 5 wherein X is not less than 0.167 and Y is not greater than 1.00.

7. The composition of claim 1 wherein said alkaline ionic silicate is lithium silicate, said acid is acetic acid and X and Y are as follows:

$$X = 10\left[2.59 - \frac{\phi}{2} - \left(1.762 + \frac{35.2}{D}\right) - \frac{pH}{2} + \frac{\exp.(pH-9.74)}{S}\right]$$

$$Y = 10\left[3.48 - \frac{\phi}{2} - \left(1.762 + \frac{35.2}{D}\right) - \frac{pH}{2} + \frac{\exp.(pH-9.74)}{S}\right]$$

8. The composition of claim 7 wherein X is not less than 0.167 and Y is not greater than 1.00.

9. A silica gel consisting essentially of from 0% to 95% by weight of a particulate or fibrous filler material and at least 5% by weight of amorphous colloidal silica particles having a median particle diameter of from 5 to 500 m$\mu$, said colloidal silica particles being rigidly interconnected in a porous three-dimensional network by from 0.5 to 10% by weight of a polymerized alkaline ionic silicate.

10. The silica gel of claim 9 wherein said median particle diameter is at least 50 m$\mu$.

11. A silica gel consisting essentially of from 0% to 95% by weight of a particulate or fibrous filler material and at least 5% by weight of amorphous colloidal silica particles having a median particle diameter of from 5 to 500 m$\mu$, substantially all of said colloidal silica particles having diameters of from 0.8 to 1.2 times said median particle diameter, said colloidal silica particles being rigidly interconnected in a porous, three-dimensional network by from 0.5 to 10% by weight of a polymerized alkaline ionic silicate, at least 60% of the pores in said network having a pore diameter of from 0.8 to 1.2 times the median diameter of said pores, said median pore diameter being from 0.5 to 1.5 times said median particle diameter, the pore volume of said network being from 45% to 75% of the volume of said network and said gel having a transverse rupture strength of at least 1500 psi.

12. The silica gel of claim 11 wherein said median particle diameter is at least 50 m$\mu$.

13. A process for producing a shaped structure comprising the steps of:
   1. forming a composition consisting essentially of
      a. from 0% to 95% by weight of a particulate or fibrous filler material and
      b. from 5% to 100% by weight of an aqueous binder vehicle consisting essentially of from 20% to 75% by weight of colloidal amorphous silica having a median particle diameter of from 5 to 500 m$\mu$; from X to Y moles of dissolved alkaline ionic silicate per 1000 grams of said vehicle exclusive of said silica where X and Y are as follows:

$$X = 10\left[1.90 - \frac{\phi}{2} - \left(1.762 + \frac{35.2}{D}\right) - \frac{pH}{2} + \frac{\exp.(pH-10.27)}{S}\right]$$

$$Y = 10\left[3.70 - \frac{\phi}{2} - \left(1.762 + \frac{35.2}{D}\right) - \frac{pH}{2} + \frac{\exp.(pH-9.40)}{S}\right]$$

wherein $\phi$ is the volume fraction of silica in said vehicle, D is said median particle diameter and S is the number of moles of dissolved cations other than hydrogen per 1000 grams of said vehicle exclusive of silica, with the proviso that X is not less than 0.083 and Y is not greater than 1.67; and an amount of acid sufficient to adjust the pH of said vehicle to from 5.0 to 9.5, and
   2. maintaining said composition in the shape desired for said structure for a time sufficient for gelation to occur, said time being from 5 to 300 seconds.

14. The process of claim 13 wherein X is not less than 0.167 and Y is not greater than 1.00.

15. The process of claim 13 wherein said alkaline ionic silicate is potassium silicate, said acid is acetic acid and X and Y are as follows:

$$X = 10\left[2.81 - \frac{\phi}{2}\left(1.762 + \frac{35.2}{D}\right) - \frac{pH}{2} + \frac{\exp.(pH-10.27)}{S}\right]$$

$$Y = 10\left[3.70 - \frac{\gamma}{2}\left(1.762 + \frac{35.2}{D}\right) - \frac{pH}{2} + \frac{\exp.(pH-10.27)}{S}\right]$$

16. The process of claim 15 wherein X is not less than 0.167 and Y is not greater than 1.00.

17. The process of claim 13 wherein said alkaline ionic silicate is sodium silicate, said acid is hydrochloric acid and X and Y are as follows:

$$X=10\left[2.57-\frac{\phi}{2}-\left(1.762+\frac{35.2}{D}\right)-\frac{pH}{2}+\frac{\exp.(pH-9.87)}{S}\right]$$

$$Y=10\left[3.46-\frac{\phi}{2}-\left(1.762+\frac{35.2}{D}\right)-\frac{pH}{2}+\frac{\exp.(pH-9.87)}{S}\right]$$

18. The process of claim 17 wherein X is not less than 0.167 and Y is not greater than 1.00.

19. The process of claim 13 wherein said alkaline ionic silicate is lithium silicate, said acid is acetic acid and X and Y are as follows:

$$X=10\left[2.29-\frac{\phi}{2}-\left(1.762+\frac{35.2}{D}\right)-\frac{pH}{2}+\frac{\exp.(pH-9.74)}{S}\right]$$

$$Y=10\left[3.48-\frac{\phi}{2}-\left(1.762+\frac{35.2}{D}\right)-\frac{pH}{2}+\frac{\exp.(pH-9.74)}{S}\right]$$

20. The process of claim 19 wherein X is not less than 0.167 and Y is not greater than 1.00.

* * * * *

UNITED STATES PATENT OFFICE
CERTIFICATE OF CORRECTION

PATENT NO. : 3,920,578
DATED : November 18, 1975
INVENTOR(S) : Paul Clifford Yates It is certified that error appears in the above-identified patent and that said Letters Patent are hereby corrected as shown below:

Column 18, line 26, "comprising" should be -- consisting essentially of --.

Column 18, line 61, the portion of the formula "$Y=10\left[3.70-\frac{Y}{2}\right.$" should read -- $Y=10\left[3.70-\frac{\phi}{2}\right.$ --.

Column 20, line 6, the portion of the formula "$X=10\left[2.29\right.$" should read -- $X=10\left[2.59\right.$ --.

Signed and Sealed this eighteenth Day of May 1976

[SEAL]

Attest:

RUTH C. MASON
Attesting Officer

C. MARSHALL DANN
Commissioner of Patents and Trademarks